Patented July 8, 1947

2,423,520

UNITED STATES PATENT OFFICE 2,423,520

PHOTOPOLYMERIZATION OF VINYLIDENE COMPOUNDS IN THE PRESENCE OF N-DI-SUBSTITUTED DITHIOCARBAMIC ESTERS

Lawrence Marion Richards, Wilmington, Del., assignor to E. I. du Pont de Nemours & Company, Wilmington, Del., a corporation of Delaware No Drawing. Application October 6, 1943, Serial No. 505,192

5 Claims. (Cl. 204—162)

This invention relates to the photopolymerization of unsaturated organic compounds.

The polymerization of ethylenically unsaturated organic compounds under the influence of light is well known. Certain materials have been employed as photopolymerization catalysts in the photopolymerization of ethylenically unsaturated organic compounds. Many of these are, however, subject to disadvantages.

This invention has as an object the provision of a process for the photopolymerization of polymerizable organic compounds using new photopolymerization catalysts. Other objects will appear hereinafter.

These objects are accomplished by the following invention which comprises irradiating with light of wave lengths in the range of from 2500 to 5000 Angstrom units, a composition comprising a photopolymerizable vinyl or vinylidene compound, e. g., one containing at least one $CH_2=C<$ group activated by direct attachment to a different negative group, e. g., halogen, $C=O$, $CN$, $-C\equiv C$, $-O-$, or aryl, and from 0.01 to 5.0% of an N-disubstituted dithiocarbamic ester of an aliphatic alcohol soluble in the vinyl or vinylidene compound, the irradiation being of sufficient intensity and employed for a time sufficient to produce substantial polymerization.

In the preferred practice of this invention, from 0.1 to 1.0% by weight, of an N-dihydrocarbon-substituted dithiocarbamic ester of an aliphatic monohydric alcohol, for example, carboxymethyl N,N-dimethyldithiocarbamate, is dissolved in a photopolymerizable vinyl or vinylidene compound as above described. If desired, a mutual solvent can also be added to this solution. The solution is then placed in a vessel transparent to light of wave lengths from 2500 to 5000 Angstrom units. Borosilicate glass is a satisfactory transparent material for the construction of suitable containers for the polymerization reaction mixture. The air over the solution is displaced with nitrogen, and the vessel and the contents are maintained at a temperature from 25 to 100° C. while exposed to a light source rich in the above wave lengths, until a substantial degree of polymerization of the unsaturated compound has occurred.

The invention is further illustrated by the following examples in which parts are by weight.

EXAMPLE I

Twenty-five parts of styrene containing 0.25 part of carboxymethyl N,N-dimethyldithiocarbamate dissolved therein was placed in a borosilicate glass vessel under an atmosphere of nitrogen and exposed to the radiation from a mercury lamp (100 watts) at a distance of 12 inches from the source of radiation, for a period of 5½ hours at a temperature of about 80° C. At the end of this time, about 71% of the irradiated sample of styrene containing the dithiocarbamate had been converted to polymeric styrene. A similar sample of styrene irradiated under the same conditions for the same length of time but containing no added agent contained only 1-2% of polymeric styrene.

EXAMPLE II

Identical amounts of solutions of styrene each containing 1% by weight, respectively, of the dithiocarbamates of Table I below were placed in borosilicate glass tubes of the same size and shape. The air was displaced with nitrogen and the tubes were closed. The borosilicate glass tubes containing the styrene solutions of the various dithiocarbamates were exposed to irradiation from a mercury lamp (100 watts) at 80° C. and at a distance of 12 inches from the source of radiation. After six hours, the radiation was stopped and the amount of polystyrene in each sample determined. A sample of styrene containing no added agent was irradiated under the same conditions to serve as a control. In Table I below is shown the per cent polymer formed in each one of the solutions tested.

TABLE I

Photopolymerization of styrene at 80° C.

| Added dithiocarbamate | Percent Polymer formed |
|---|---|
| Carbethoxymethyl N,N-pentamethylenedithiocarbamate | 100 |
| Bis(carbethoxymethyl) ester of 1,4-piperazine-bis-(carbodithioic acid) | 100 |
| Methyl N,N-pentamethylenedithiocarbamate | 33 |
| Methyl N,N-hexamethylenedithiocarbamate | 14 |
| Dodecyl N,N-di-n-butyldithiocarbamate | 18 |
| Beta-hydroxyethyl N,N-dimethyldithiocarbamate | 22 |
| None (control) | 2 |

EXAMPLE III

Identical amounts of the vinyl and vinylidene compounds of Table II below, both in the pure state and containing in solution 1% of the dithiocarbamate shown, were placed in borosilicate glass tubes of the same size and shape, the air replaced with nitrogen, the tubes were closed, and were irradiated at 25° C. with the light from a mercury lamp (100 watts) placed 12 inches from the tubes. After a suitable period, irradiation was stopped, and the per cent polymer obtained was determined both for the sample containing the added dithiocarbamate and the sample containing no added agent. The results are given in the following table.

TABLE II

*Photopolymerization of selected vinyl and vinylidene compounds in the presence of N-disubstituted dithiocarbamates at 25° C.*

| Added Agent | Styrene, percent Polymer in 27 hrs. | Vinyl Acetate, percent Polymer in 23 hrs. | Methyl Methacrylate, percent Polymer in 7.5 hrs. | Chloroprene, percent Polymer in 8 hrs. | Dimethyl Vinylethinyl Carbinol, percent Polymer in 22 hrs. |
|---|---|---|---|---|---|
| (1) None (control) | 0 | 0 | 0 | 5 | 0 |
| (2) Carbethoxymethyl N,N-pentamethylenedithiocarbamate | 58 | 7 | 41 | 37 | 91 |
| (3) Bis(carbethoxymethyl) 1,4-piperazine-bis-carbodithioate | 80 | 7 | 94 | 47 | 100 |

The photopolymerizable compounds with which this invention is concerned are the photopolymerizable vinyl and vinylidene compounds containing at least one $CH_2=C<$ group activated by attachment to a different negative group, that is, halogen, $-C=O$, $-CN$, $-C\equiv C-$, $-O-$, or aryl. These include vinyl esters, e. g., vinyl acetate, vinyl propionate; vinyl halides, e. g., vinyl chloride; vinyl ketones, e. g., methyl vinyl ketone; vinyl ethers, e. g., vinyl ethyl ether; vinyl cyanides, e. g., acrylonitrile; esters of acrylic acid, e. g., methyl acrylate and ethylene diacrylate; styrene; and vinyl ethinyl carbinol. Vinylidene compounds which can be used are esters of methacrylic acid, e. g., methyl methacrylate, allyl methacrylate, ethylene dimethacrylate; vinylidene halides, e. g., vinylidene chloride; vinylidene cyanides, e. g., methacrylonitrile; and esters of alpha-substituted acrylic acids, e. g., methyl alpha-chloroacrylate and methyl alpha-phenylacrylate. Of these compounds those having a vinyl or vinylidene group attached to an aromatic ring, and in particular styrene, are preferred since the N-disubstituted dithiocarbamates are most effective in bringing about satisfactory rate of photopolymerization and in the production of colorless products adapted to optical use. While chloroprene may also be polymerized by the method of this invention, it gives an insoluble gel.

The N-disubstituted dithiocarbamates useful for increasing the rate of photopolymerization of the above vinyl and vinylidene compounds include the N-dialkyl dithiocarbamates, for example, the N-dimethyl, N-diethyl, N-dibutyl, N-dioctyl and N-didodecyl dithiocarbamates. Specific compounds falling in this class are methyl N,N-dimethyldithiocarbamate, ethyl N,N-dibutyldithiocarbamate, ethyl N,N-didodecyldithiocarbamate, and the like. Also included are the N-diaryl dithiocarbamates, for example, methyl N,N-diphenyldithiocarbamate; the N-disubstituted dithiocarbamates wherein the substituents on the nitrogen are joined to form a ring as in methyl N,N-hexamethylene-dithiocarbamate and methyl N,N-pentamethylenedithiocarbamate; compounds having two N-disubstituted dithiocarbamate residues in the molecule, for example, bis-(carbethoxymethyl) 1,4-piperazine-bis-carbodithioate. The N,N-dihydrocarbon substituted dithiocarbamates are the most useful in this invention and of these the N-dialkyl compounds are the preferred group.

The N-disubstituted dithiocarbamates employed in the process of this invention are esters of aliphatic alcohols, for example, the alkanols, e. g., methanol, ethanol, butanol, octanol, dodecyl alcohol; the polyhydric alcohols, for example, ethylene glycol; aliphatic alcohols containing ether groups in the chain, e. g., methoxyethanol, ethoxyethanol, butoxyethanol; aliphatic alcohols containing carboxy acid and carboxy ester groups, e. g., carbomethoxymethanol, carboxymethanol, carbethoxymethanol, etc. Specific N-disubstituted dithiocarbamates of these classes of alcohols are methyl N,N-dibutyldithiocarbamate, ethyl N,N-diphenyldithiocarbamate, butyl N,N-hexamethylenedithiocarbamate, dodecyl N,N-dimethyldithiocarbamate, beta-hydroxy-ethyl N,N-diethyldithiocarbamate, methoxyethyl N,N-diethyldithiocarbamate, butoxyethyl N,N-dimethyldithiocarbamate, carbomethoxymethyl N,N-diethyldithiocarbamate, carbethoxymethyl N,N-dibutyldithiocarbamate, carbethoxymethyl N,N-hexamethylenedithiocarbamate. The preferred dithiocarbamates are those formed from alcohols containing ester groups since these give the greater increase in the rate of photopolymerization of the vinyl and vinylidene compounds and in particular, styrene.

In general, from 0.1 to 5.0% by weight of the dithiocarbamate, based on the vinyl or vinylidene compound, can be used although it is preferred to use amounts from 0.1 to 1.0%. The dithiocarbamates must be soluble in the vinyl or vinylidene compound with which they are used. They must also be free from nitro, hydroxyl and primary amino groups attached to aromatic carbon.

The source of radiation is limited only to those providing wave lengths in the range of 2500–5000 Angstrom units, and preferably in the wave length region of 2800 to 4000 Angstrom units. Sources of radiation that are commercially available include mercury lamps and arcs, carbon arcs, and hydrogen discharge tubes. Sunlight can also be used as a source of light containing the desired wave lengths. Tungsten lamps of sufficient intensity also find utility as light sources.

The photopolymerization can be carried out at temperatures of from 0° to 150° C. but in practice the range of from 25° to 100° C. is the most useful. Methyl methacrylate operates best at around 25° C., whereas styrene requires a temperature of from 60° to 80° C. for a sufficiently rapid polymerization cycle.

The vessel in which the polymerization is conducted must be transparent to light of the desirable wave lengths when the reaction is conducted so that the light passes through the sides of the container. It is also possible to place the source of light directly over the surface of the monomer in a container or within the reaction mixture itself.

The exclusion of oxygen from the photopolymerization systems of this invention has been found advantageous and in carrying out the photopolymerization, steps are usually taken to replace the air by an inert gas, for example, nitrogen.

Photopolymerizations in accordance with this process can be carried out in solution, emulsion, or in granular systems. In the preferred process, however, the photopolymerizable monomer contains in addition to the dithiocarbamate at most only limited quantities of a mutual solvent.

In some cases, however, it may be desirable to add an organic peroxide catalyst, for example, benzoyl peroxide, lauroyl peroxide, or diethyl peroxide to the photopolymerization mixture containing the dithiocarbamate since the monomer/dithiocarbamate/peroxide combination may be heated to give viscous casting syrups which, when poured into a transparent mold, polymerize rapidly upon exposure to light to give a precisely shaped object.

This invention is applicable not only to the photopolymerizable vinyl and vinylidene compounds as above described but also to mixtures thereof and to mixtures of other unsaturated materials photopolymerizable in the presence of the compounds of this invention.

The products of this invention are useful as molding powders, adhesives, coating and impregnating agents, transparent resinous enclosures, safety glass interlayers, etc. In addition, when photopolymerization of the compositions is carried out within a mold, useful optical articles such as lenses, prisms, diffration gratings, etc., can be obtained. These are less brittle than the inorganic glasses and require no expensive and laborious grinding procedure. They also have the added advantage of being considerably lighter in weight than the inorganic glasses.

The above description and examples are intended to be illustrative for obvious modifications thereof which conform to the spirit of the invention will occur to a person skilled in the art.

What is claimed is:

1. A process for preparing polymers of styrene which comprises irradiating with light of wave length in the range from 2500 to 5000 Angstrom units a mixture of styrene with from 0.01 to 5% by weight, based on the styrene, of carboxymethyl N,N-dimethyldithiocarbamate, the irradiation being of sufficient intensity and being employed for a time sufficient to produce substantial polymerization.

2. A process for preparing polymers which comprises irradiating, with light of wave length in the range from 2500 to 5000 Angstroms, a composition comprising a polymerizable compound having but one $CH_2=C<$ group and that activated by direct attachment to a different negative group of the class consisting of halogen, $>C=O$, $-CN$, $-C\equiv C-$, $-O-$ and aryl and from 0.01 to 5%, based on the weight of said $CH_2=C<$ compound, of an N-disubstituted dithiocarbamic acid ester of an aliphatic alcohol, the irradiation being of sufficient intensity and employed for a time sufficient to produce substantial polymerization.

3. A process for preparing polymers which comprises irradiating, with light of wave length in the range from 2500 to 5000 Angstroms, a composition comprising a polymerizable vinyl aryl compound having the aryl group directly attached to a carbon of the vinyl group and from 0.01 to 5%, based on said vinyl aryl compound, of an N-disubstituted dithiocarbamic acid ester of an aliphatic alcohol, the irradiation being of sufficient intensity and employed for a time sufficient to produce substantial polymerization.

4. A process for preparing polymers which comprises irradiating, with light of wave length in the range from 2500 to 5000 Angstroms, a composition comprising styrene and from 0.01 to 5%, by weight thereof, of an N-disubstituted dithiocarbamic acid ester of an aliphatic alcohol, the irradiation being of sufficient intensity and employed for a time sufficient to produce substantial polymerization.

5. A process for preparing polymers of styrene which comprises irradiating with light of wave length in the range from 2500 to 5000 Angstrom units a mixture of styrene with from 0.01 to 5% by weight, based on the styrene, of bis(carbethoxy-methyl) 1,4-piperazine - bis - carbodithioate, the irradiation being of sufficient intensity and being employed for a time sufficient to produce substantial polymerization.

LAWRENCE MARION RICHARDS.

REFERENCES CITED

The following references are of record in the file of this patent:

UNITED STATES PATENTS

| Number | Name | Date |
| --- | --- | --- |
| 1,950,439 | Carothers et al. | Mar. 13, 1934 |
| 2,309,088 | Auer | Jan. 26, 1943 |
| 2,351,108 | Collins | June 13, 1944 |

OTHER REFERENCES

Rubber Chemistry and Technology, volume 7, 1934, pages 184–196.

Journal American Chemical Society, Nov. 1939, pages 3089–3092.